United States Patent [19]

Harz et al.

[11] Patent Number: 5,433,668
[45] Date of Patent: Jul. 18, 1995

[54] CONSTANT VELOCITY FIXED JOINT WITH SUPPORTING INSERTS

[75] Inventors: Peter Harz, Hennef; Werner Krude, Neunkirchen; Herbert Taureg, Hennef, all of Germany

[73] Assignee: GKN Automotive AG, Germany

[21] Appl. No.: 41,544

[22] Filed: Apr. 2, 1993

[30] Foreign Application Priority Data

Apr. 3, 1992 [DE] Germany ............... 42 11 170.6
Apr. 3, 1992 [DE] Germany ............... 42 11 042.4
Feb. 10, 1993 [DE] Germany ............... 43 03 901.4

[51] Int. Cl.⁶ .................................................. F16D 3/224
[52] U.S. Cl. ................................... 464/145; 464/906
[58] Field of Search ............... 464/145, 906, 143, 144

[56] References Cited

U.S. PATENT DOCUMENTS

| | | | |
|---|---|---|---|
| 1,916,442 | 7/1933 | Rzeppa . | |
| 3,362,192 | 1/1968 | Orain | 464/146 |
| 3,798,927 | 3/1974 | Girguis | 464/146 |
| 3,815,381 | 6/1974 | Wagner | 464/146 |
| 3,858,412 | 1/1975 | Fisher et al. | 464/906 |
| 4,012,924 | 3/1977 | Krude | 464/906 |
| 4,020,648 | 5/1977 | Krude | 464/906 |
| 4,116,020 | 9/1978 | Aucktor et al. . | |
| 4,188,803 | 2/1980 | Otsuka et al. . | |
| 4,432,740 | 2/1984 | Petiot | 464/906 |
| 4,533,339 | 8/1985 | Girguis | 464/906 |
| 4,610,643 | 9/1986 | Krude . | |
| 4,915,672 | 4/1990 | Girguis | 464/906 |

FOREIGN PATENT DOCUMENTS

2522670 12/1976 Germany .
3721775 1/1989 Germany .
3233753 6/1990 Germany .

Primary Examiner—Daniel P. Stodola
Assistant Examiner—Eileen A. Dunn
Attorney, Agent, or Firm—Harness, Dickey & Pierce

[57] ABSTRACT

A constant velocity fixed joint having an outer joint part, an inner joint part, a cage and torque transmitting balls has the cumulative clearance errors of the joint minimized via the fixing method of supporting inserts. This is achieved in that a ring is provided with at least two fingers pointing axially and radially inward into the cavity of the outer joint part and arranged between two outer running grooves so as to abut the spherical contact face of the cage. While the clearances between the internal joint components are positioned at a predetermined relationship, the ring is positioned at an axial distance from a reference face located at the open end of the outer joint part and that the ring, while observing a predetermined axial play, is connected to the outer joint part. The inner faces of the outer joint part arranged between the outer running grooves thus being held at a predetermined position relative to the spherical outer face of the cage. A method is provided which substantially facilitates handling while individual supporting inserts are attached and which allows the joint play to be set in the specified way. This is achieved in that the outer joint part is provided with recesses arranged between the outer running grooves. Wedge-shaped inserts serving to axially secure the cage and being connected to one another by an annular strip are inserted into the recesses. The wedge-shaped inserts are welded to the recesses and after the welding operation the annular strip between the wedge-shaped supporting inserts is removed.

14 Claims, 9 Drawing Sheets

CONSTANT VELOCITY FIXED JOINT WITH SUPPORTING INSERTS

FIELD OF THE INVENTION

The invention relates to a constant velocity fixed joint having a bell-shaped outer joint part comprising a cavity and uniformly circumferentially distributed undercut-free outer running grooves, an inner joint part with inner running grooves corresponding to the outer running grooves and with torque transmitting balls received in the inner and outer running grooves and guided in the windows of a cage arranged between the outer joint part and the inner joint part, with the inner faces of the outer joint part arranged between the outer running grooves being designed to be undercut-free and with the cage being axially outwardly secured by supporting inserts arranged on the inner faces of the outer joint between the outer running grooves, the supporting inserts being associated with a ring. In addition, the invention relates to a method of attaching the supporting inserts for axially securing the cage of the constant velocity universal joint.

BACKGROUND AND SUMMARY OF THE INVENTION

From DE-PS 25 22 670 it is known to axially secure the cage of a constant velocity fixed joint via a supporting disc secured at the open end of the outer joint part. It is the object of the above publication to facilitate assembly by using an undercut-free outer joint part.

The disadvantage of the design described is that the balls in the running tracks run with play and that only the axial play of the cage can be set. This necessarily means that there exists play between the inner joint part, the ball and the outer joint part on the one hand and between the inner joint part, the cage and the outer joint part on the other hand.

This means that there are two sequences of play of which, as illustrated in FIG. 1 of the said publication, only one sequence, i.e. the axial play between the cage and outer joint part can be set.

Furthermore, it has been proposed (DE-OS 3721775) to guide the cage by a so-called supporting disc so as to be pivotable around the joint center, with the supporting disc being received in a holding ring and being able to move therein in a radially floating way.

The disadvantage of this design is that by arranging the holding ring and supporting disc in front of the open axial end of the outer joint part the possible angle of articulation may be adversely affected.

A constant velocity universal joint with wedge-shaped supporting elements for axially securing the cage is known (German Patent Application 42032195.8). The disadvantage of the design described is that the supporting inserts have to be secured individually.

As the supporting inserts are very small, handling during the fixing and welding operation is extremely complicated.

There is a further prior art design as described in DE-PS 3233753 where the inner face of the outer joint part is partially stepped relative to the spherical outer face of the cage.

However, this publication does not propose any measures for setting the play.

The play values resulting from production tolerances may add up in a disadvantageous way, thereby resulting in increased joint wear.

It is the object of the present invention to provide a constant velocity fixed joint in the case of which the two sequences of play are defined and are capable of being set to a specified value. At the same time, assembly is to be simplified by axially introducing the inner joint part together with the cage and the inserted balls.

In accordance with the invention, the objective is achieved in that the balls are held in a clearance-free way in the outer running grooves and in the inner running grooves, that a ring is provided with at least two fingers pointing axially and radially inwardly into the cavity of the outer joint part and held between two outer running grooves so as to abut the spherical outer face of the cage. The ring is arranged at an axial distance(s) from a reference face located at the open end of the outer joint part, and that the ring, while observing a predetermined axial play relative to the cage, is connected to the outer joint part, with the inner faces of the outer joint part arranged between the outer running grooves being held at a distance from the spherical outer face of the cage.

The advantage of the design in accordance with the invention is that the ring, with the fingers supporting the cage, is connected to the outer joint part in a position where it is aligned relative to the cage. In this way it is ensured that all cumulative errors occurring in the joint are eliminated.

By providing a play(s) while the ball contact the outer and inner running grooves in a clearance-free way, it is ensured that a predetermined axial play can be determined very accurately.

By designing the joint in accordance with the invention, very clear conditions are obtained for the play values existing in the joint. The first sequence of play between the outer joint part, the balls and the inner joint part is set to zero and the second sequence of play between the outer joint part, cage and inner joint part is suitable for being set.

In this way, both sequences of play are clearly defined.

According to an advantageous embodiment of the invention, the fingers starting from the ring are arranged radially inwardly, with the fingers of the ring secured to the outer joint part being crimped in the direction of the cavity.

The advantage of this design is that the ring together with the fingers may be punched out of a plate metal material and the fingers are then bent, which means that the ring can be produced very cost-effectively.

According to a further essential feature of the invention, the fingers are designed as wedge-shaped supporting projections pointing away approximately axially from the ring.

This design allows the supporting inserts to contact the spherical outer face of the cage over a relatively large area.

In a further embodiment of the invention, the outer joint part, at a radial end face associated with its open end, is provided with a radially inner recess serving to receive the ring, the inner diameter of the recess being greater than the outer diameter of the ring.

With this design, the ring may easily be fixed to the outer joint part by welding, for instance by laser welding in the axial direction of the joint, which means that it is possible to automate the welding operation.

According to a further embodiment, the ring is provided with a projection coaxially embracing the outer circumference of the outer joint part.

With this design, too, the ring may easily be welded to the outer joint part.

In a further advantageous embodiment of the invention, the coaxial projection of the ring is used as a seat for a convoluted boot secured to the outer joint part.

As a result of this measure, it is easy to fix the convoluted boot to the coaxial projection of the ring.

According to a further embodiment of the invention it is proposed that the diameter of the ring should be greater than the outer circumference of the outer joint part and that the part of the ring projecting beyond the outer circumference of the outer joint part should be used as a stop for a convoluted boot secured to the outer circumference of the outer joint part.

This design permits an inexpensive and easy possibility of fixing the convoluted boot to the outer joint part.

In a preferred embodiment of the invention it is proposed that the outer joint part, at its open axial end, is provided with at least two radially extending grooves, that a closed ring is secured in the radially outer region and that the ring is provided with fingers which correspond to the grooves, which pass radially through the grooves and which are held so as to abut the spherical face of the cage.

With this design, the ring, including the fingers, is integrated into the axial length of the outer joint part so that the maximum articulation angle is not limited in any way.

According to a further advantageous feature, the outer joint part, at its open axial end, is provided with a continuous step and the radially outer free space produced by the step is intended to receive the ring.

As a result, it is easy to weld the ring to the outer joint part.

According to a further embodiment of the invention, the ring is produced from a radially extending flat material and welded via a V-weld to the outer circumference of the outer joint part.

Again, it is easy to secure the ring to the outer joint part.

According to a further advantageous embodiment of the invention, the ring is designed as a ring which extends coaxially relative to the joint axis, which embraces the outer circumference of the outer joint part and is welded thereto via a fillet weld, with the fingers being angled relative to the joint axis.

According to a further feature of the invention, the fingers, starting from the inwardly directed radial direction, are additionally angled approximately axially towards the center of the joint, and the angled web is adapted to the spherical outer face of the cage. This design permits the fingers to contact the spherical outer face of the cage over a large area.

According to a further feature of the invention, the fingers are designed approximately box-like as hollow profiles, and the contact face is adapted to the spherical outer face of the cage.

With this design, the fingers are able to support high axial forces acting on the cage.

In a further embodiment, the fingers are designed as solid profiles with a rectangular cross-section, with the radially inner faces of the fingers being adapted to the spherical outer face of the cage.

In accordance with another embodiment of the invention, the objective is achieved in that the outer joint part is provided with recesses arranged between the outer running grooves, that wedge-shaped inserts serving to axially secure the cage and being connected to one another by an annular strip are inserted into the recesses and that the wedge-shaped inserts are welded to the outer joint part in the recesses and that after the welding operation the annular strip is removed from between the wedge-shaped supporting inserts.

The advantage of the method proposed in accordance with the invention consists in that while the wedge-shaped supporting inserts are in the process of being secured they are, without fail, easy to handle and that by separating the parts of the annular strip positioned between the wedge-shaped supporting inserts it is ensured that the maximum angle of articulation is not adversely affected.

According to an essential feature of the invention, the regions of separation of the annular strip are predetermined by nominal fracture regions provided at both ends of the supporting inserts.

The nominal fracture regions ensure a clean line of separation at both ends of the supporting inserts thereby eliminating any need for remachining.

According to a further advantageous embodiment of the invention, the annular strip, for the purpose of being positioned in a true-to-angle way, is provided with recesses corresponding to the balls in the aligned position.

These recesses permit the annular strip provided for fixing purposes to be positioned and aligned in a simple and accurate way.

BRIEF DESCRIPTION OF THE DRAWINGS

Below, the invention will be explained in greater detail with reference to several embodiments illustrated in the drawing wherein.

DESCRIPTION OF THE PREFERRED EMBODIMENT

Figure 1:
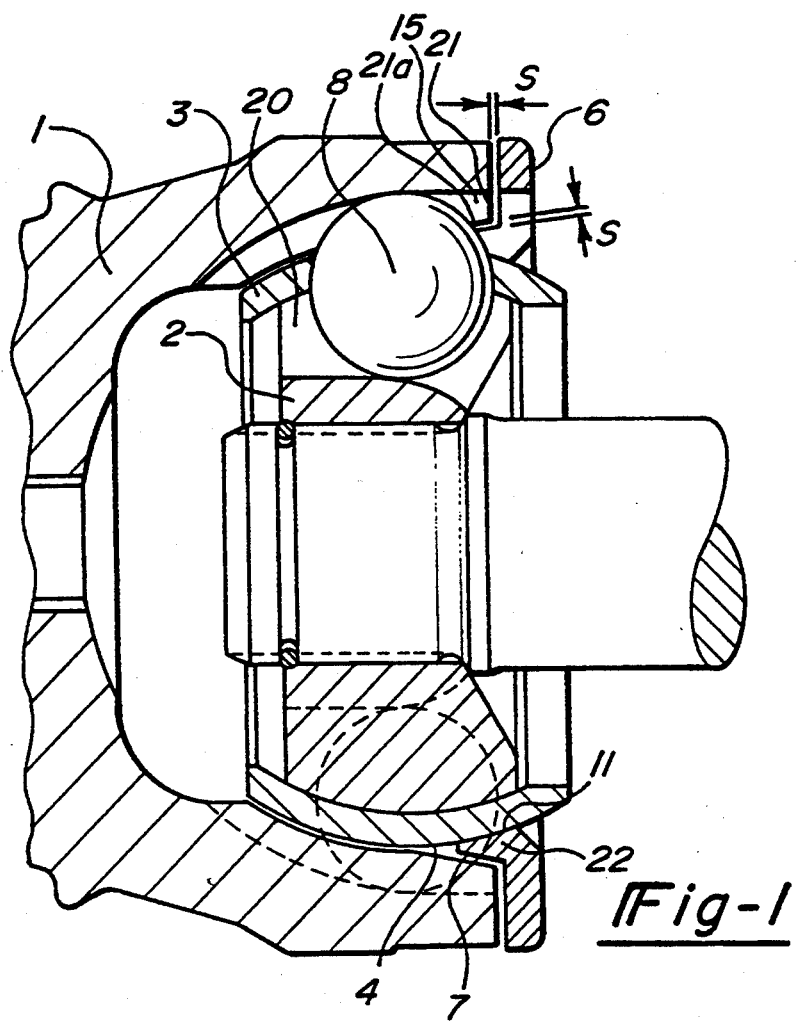
FIG. 1 is a longitudinal section through a constant velocity fixed joint provided with a ring, with the balls being arranged in the inner and outer running grooves in a clearance-free condition.

The constant velocity fixed joint, a longitudinal section of which is shown in FIG. 1, substantially consists of an outer joint part 1, an inner joint part 2, and a cage 3 which, in windows, guides the balls 8 held in a clearance-free way in the outer running grooves 15 and the inner running grooves 20. In the case of this embodiment, the ring 6 is provided with wedge-shaped supporting inserts 22 each of which, between two outer running grooves 15, axially engages the joint interior and is held so as to abut the spherical outer face 4 of the cage 3. The contact faces 11 of the ring 6 at the spherical outer face 4 of the cage 3 are designed in such a way that, with the balls 8 contacting the outer running grooves 15 and inner running grooves 20 in a clearance-free way, the ring 6 is positioned at an axial distance(s) from the reference face 21 and 21a arranged at the open end of the outer joint part 1.

Apart from the fingers 7 supporting the cage and the supporting inserts 22, the cage 3 does not contact the outer joint part 1.

Figures 2, 3:
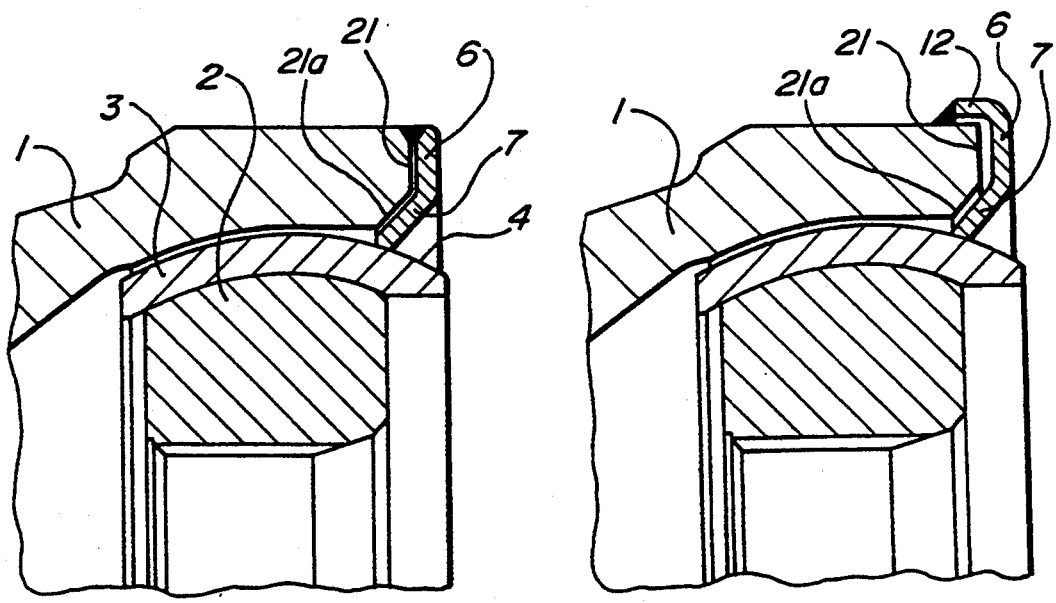
FIG. 2 shows a ring connected to the outer joint part by welding.
FIG. 3 shows a ring provided with a coaxial projection and welded to the outer joint part.

In the case of the embodiment according to FIG. 2, the ring is punched or stamped to be a one piece unit with an annular base having angled fingers 7 extending from the annular base which is welded to the outer part 1 to prevent movement of the outer part 1. Also, a gap is formed between the ring 6 and outer joint 1. The fingers 7 are supported on the spherical outer face 4 of the cage 3.

FIG. 3 shows that again the requirement of arranging the ring 6 at a distance from the reference faces 21 and 21a has been observed. It illustrates a ring 6 provided with a coaxial projection 12, with the projection 12 embracing the outer joint part 1 and being secured to the outer face of the outer joint part 1.

Figure 4:
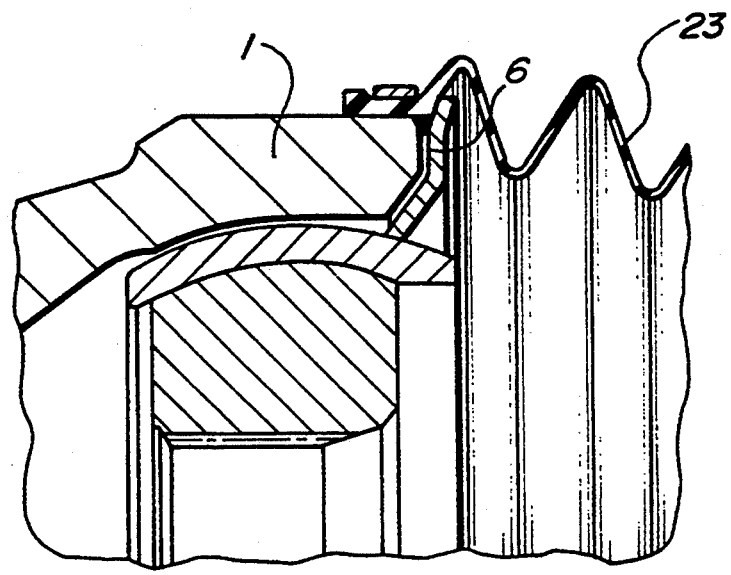
FIG. 4 is a longitudinal section through a joint provided with a ring whose outer diameter is greater than that of the outer joint part to support a convoluted boot.

FIG. 4 shows a design where the outer diameter of the ring 6 is greater than the outer circumference of the outer joint part 1, with the part of the ring 6 projecting outwardly beyond the outer joint part 1 being used as a stop for a convoluted boot 23 secured to the outer circumference of the outer joint part 1.

Figure 5:
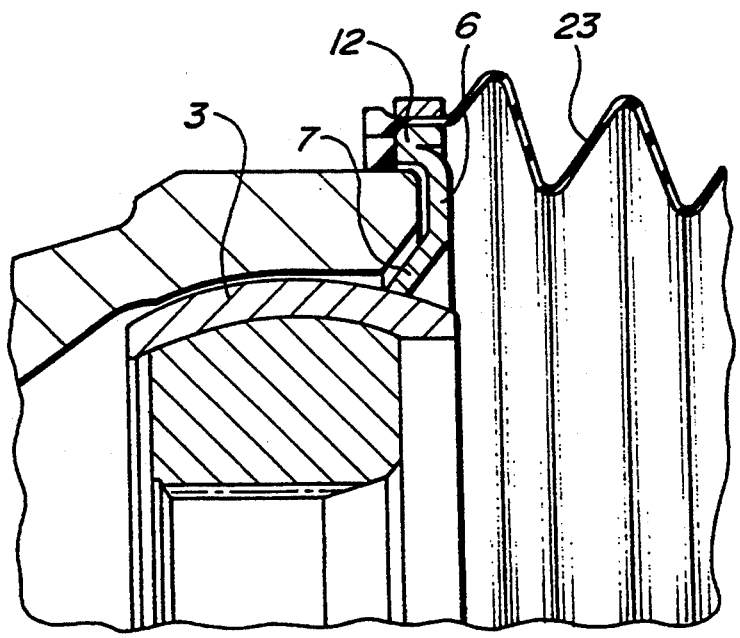
FIG. 5 is a longitudinal section through a joint, with a coaxial projection being used as a seat for a convoluted boot to be fixed.

FIG. 5 shows a ring 6 having a coaxial projection 12 which also embraces the outer joint part 1 and which, in this embodiment, is used as a seat for a convoluted boot 23.

Figure 6:
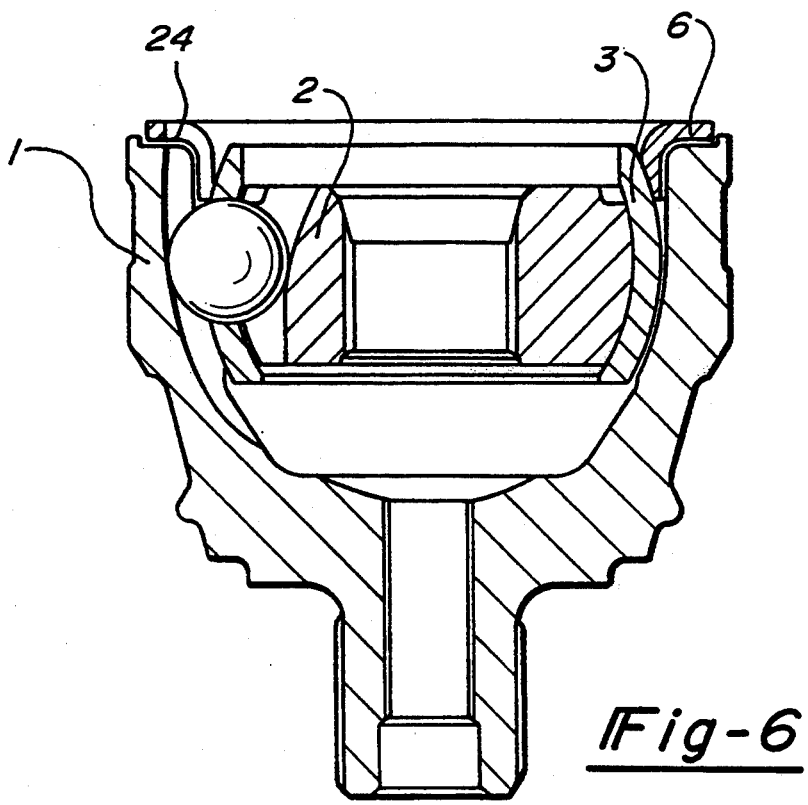
FIG. 6 is a longitudinal section through a joint having a recess for receiving the ring.

The outer joint part 1 illustrated in FIG. 6 is provided with a recess 24 located at its open radial end. The recess 24 provided at the radial inner end of the outer joint part 1 serves to receive the ring 6, with the inner diameter of the recess 24 being greater than the outer diameter of the ring 6, so that the ring 6 can easily be aligned relative to the spherical outer face 4 of the cage 3.

Figure 7:
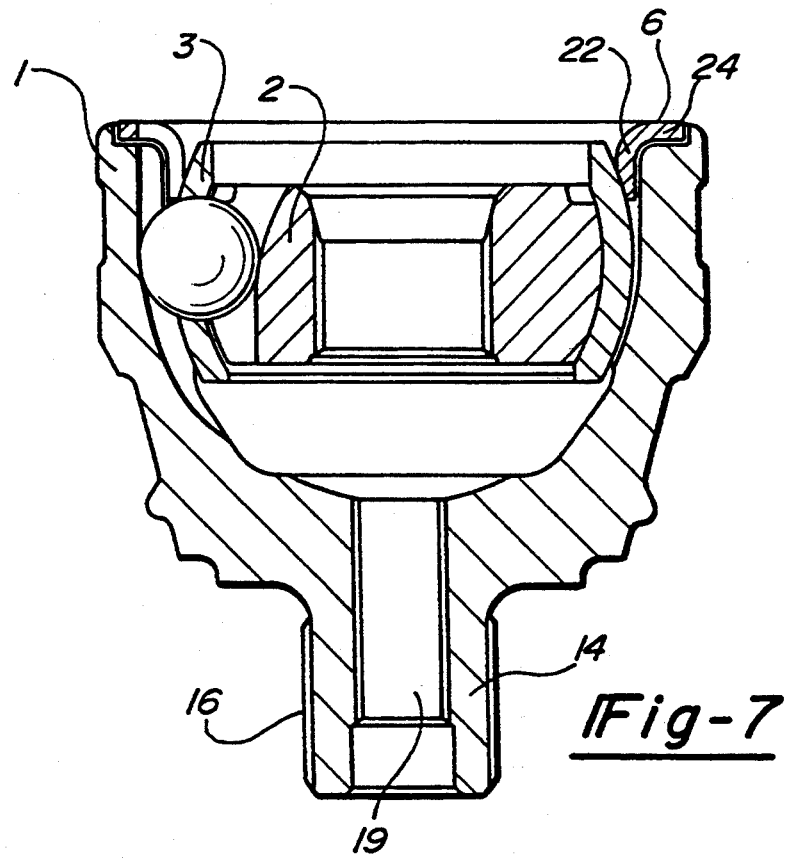
FIG. 7 is an illustration analogous to that of FIG. 6, but showing a ring which is welded to the outer joint part.

FIG. 7 shows a joint in the same design as that illustrated in FIG. 6, with the ring being welded to the outer joint part. The outer joint part 1 is provided with a journal 14 comprising multiple splines 16 and intended to be fixed to a threaded bore 19.

Figure 8:
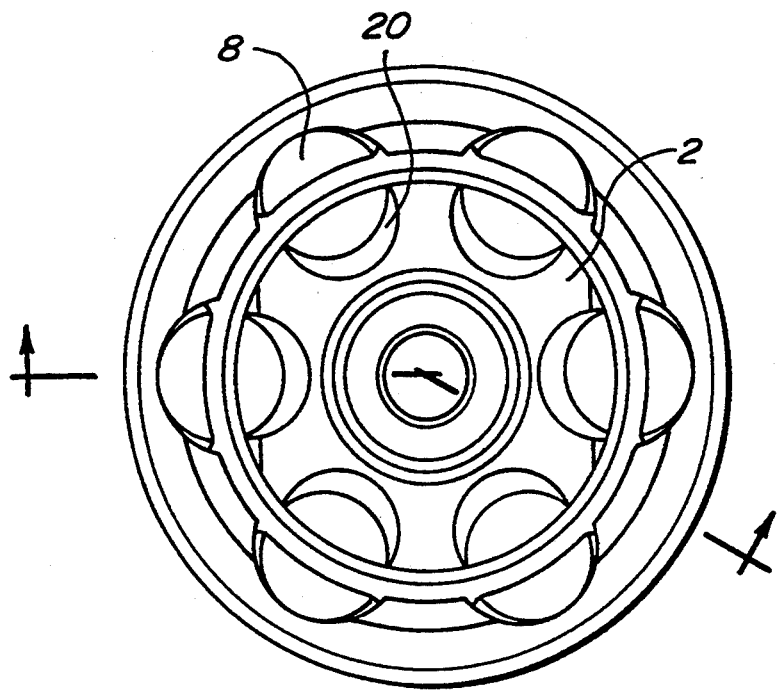
FIG. 8 is a plan view of the design according to FIG. 7.

FIG. 8 is a plan view of the joint according to FIG. 7.

FIGS. 9 to 14 show various designs of constant velocity fixed joints where because of the arrangement of ring 6 on the outer joint part 1 the angle of articulation of the joint is not restricted.

Figure 9A:
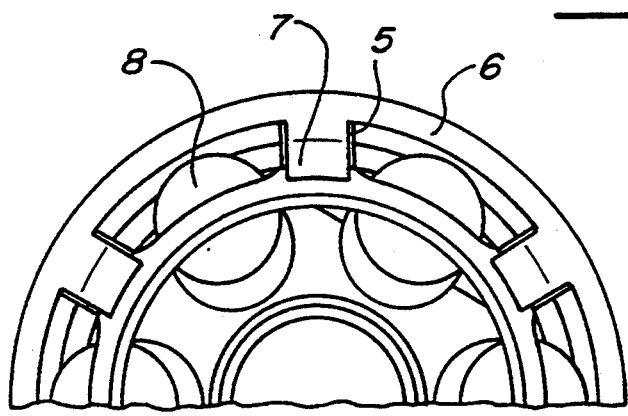
FIG. 9a is a plan view of the illustration according to FIG. 9.
Figure 9:
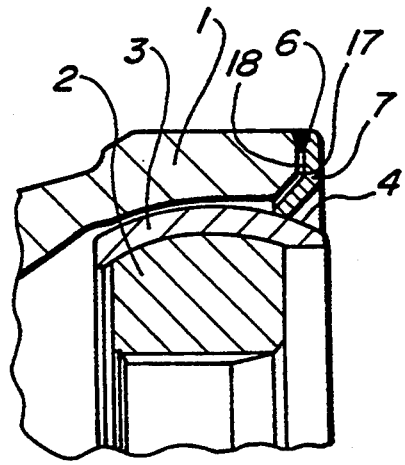
FIG. 9 is a longitudinal section through a joint design in the case of which the fingers are arranged in radially extending grooves at the open end of the outer joint part.

In FIG. 9, the open front end of the outer joint part 1 is provided with a step 17 creating a radially outer free space 18 for receiving the ring 6. For receiving the fingers 7, there are provided radially inwardly extending grooves 5 which start from the free space 17 and in which the fingers 7 are accommodated so that there is no axial projection from the outer joint part 1 and thus no restrictions are imposed on the joint articulation angle.

FIG. 9a shows a plan view of the design according to FIG. 9.

Figure 10A:
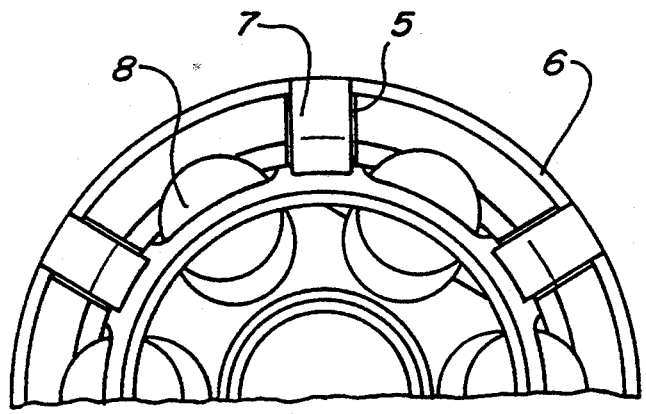
FIG. 10a is a plan view of the illustration according to FIG. 10.
Figure 10:
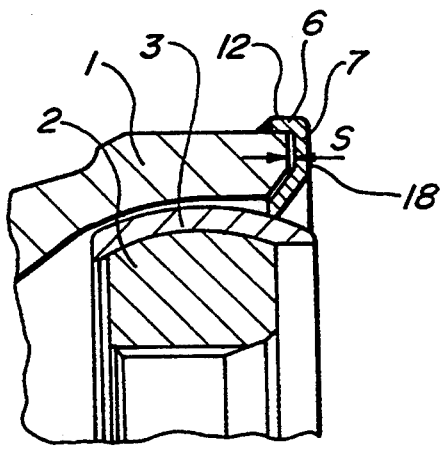
FIG. 10 is a design according to FIG. 7, but with the ring having a coaxial projection for fixing the ring to the outer joint part.

In the case of FIG. 10, the ring 6 is provided with a coaxial a projection 12 which embraces the outer joint part and is secured thereto by welding.

FIG. 10a is a plan view of the design according to FIG. 10.

Figure 11A:
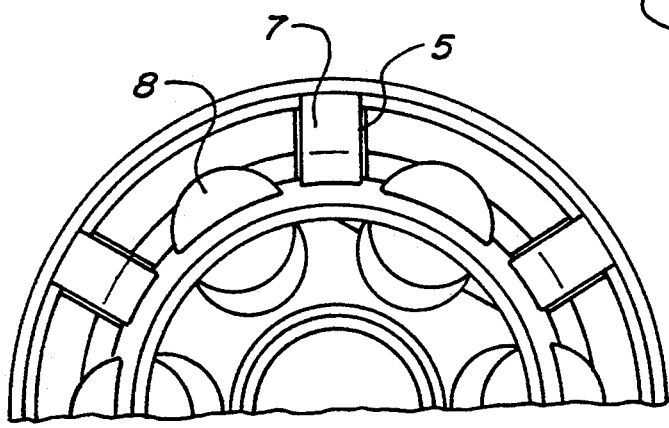
FIG. 11a is a plan view of the illustration according to FIG. 11.
Figure 11:
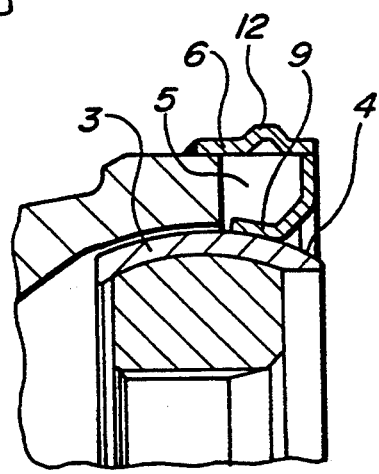
FIG. 11 shows the fingers with an angled web.

FIG. 11 shows a constant velocity fixed joint in the case of which the radially inwardly pointing fingers 7 comprise an angled web 9 which abuts the spherical outer face 4 of the cage 3.

FIG. 11a shows a plan view of the design according to FIG. 11.

Figure 12A:
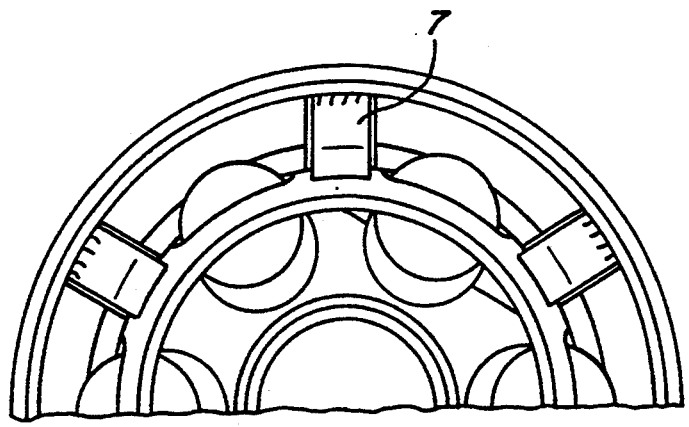
FIG. 12a is a plan view of the illustration according to FIG. 12.
Figure 12:
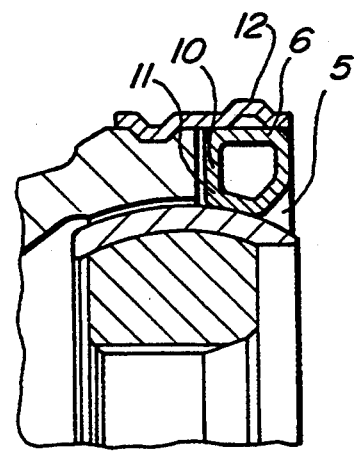
FIG. 12 shows the fingers in the form of a box-shaped hollow profile.

FIG. 12 shows a design in the case of which the fingers 7 are designed as box-shaped hollow profiles 10. In this embodiment, the fingers 7 are particularly strong.

FIG. 12a again shows a plan view of the design according to FIG. 12.

Figure 13A:
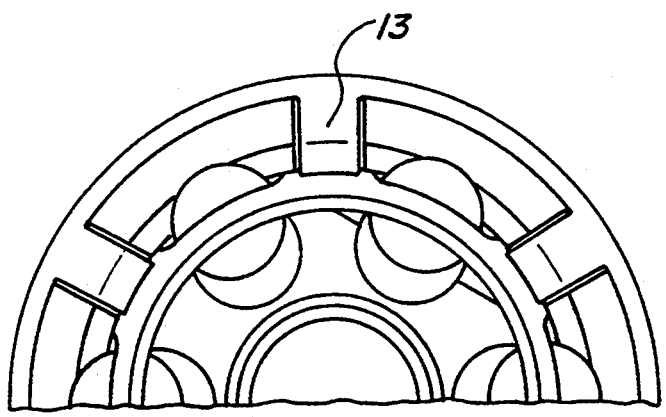
FIG. 13a is a plan view of the illustration according to FIG. 13.
Figure 13:
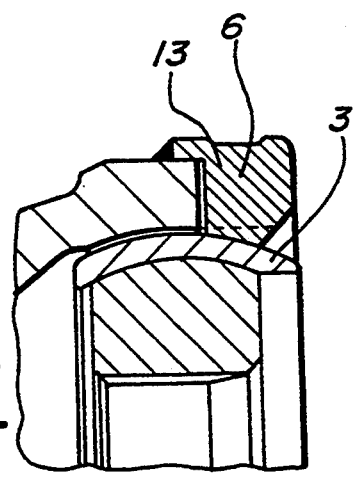
FIG. 13 shows the fingers in the form of a solid profile.

In FIG. 13, the fingers are designed as solid profiles 13.

FIG. 13a is a plan view of the design according to FIG. 13.

Figure 14:
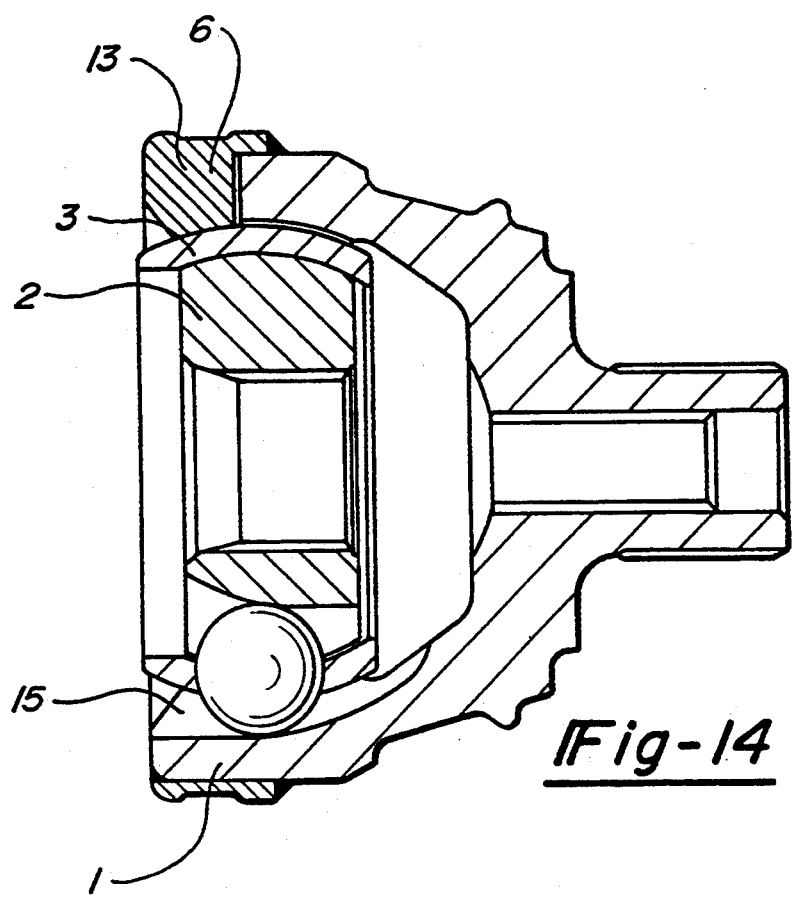
FIG. 14 is a longitudinal section through a complete joint according to FIG. 13.

FIG. 14 is a longitudinal section through a complete joint designed as shown in FIG. 13.

FIGS. 15 through 19 show a joint design where the ring 6 is designed as a temporary ring. Upon the assembly of inserts 22 into the proper position in the joint, the inserts 22 are secured to the housing. The ring 6 which extends between the individual inserts 22 is then broken away leaving only the inserts 22 to secure the cage 3.

Figure 15:
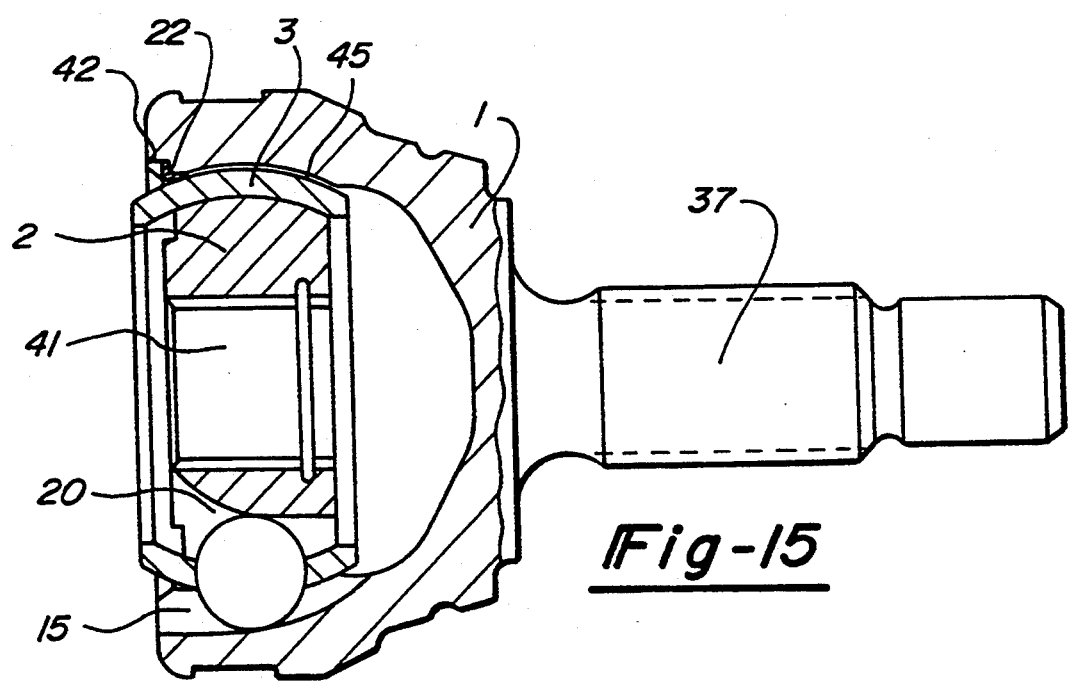
FIG. 15 is a longitudinal section through a constant velocity universal joint in the direction of arrows 15—15 of FIG. 16 in accordance with another embodiment of the invention.

The constant velocity universal joint illustrated in FIG. 15 substantially consists of the outer joint part 1 and the inner joint part 2, with a cage 3 holding balls 8 in its windows being guided between the outer joint part 1 and the inner joint part 2.

The outer joint part 1 is provided with a connecting journal 37 and the inner joint part 2 with a receiving bore 41 for a shaft to be connected. The torque transmitting balls 8 are guided in the outer running grooves 15 and the inner running grooves 20 arranged so as to correspond thereto. Between two outer running grooves 15, there are provided recesses 42 which are located at the axially open end of the outer joint part 1 and in which the wedge-shaped supporting inserts 22 are secured.

Figure 16:
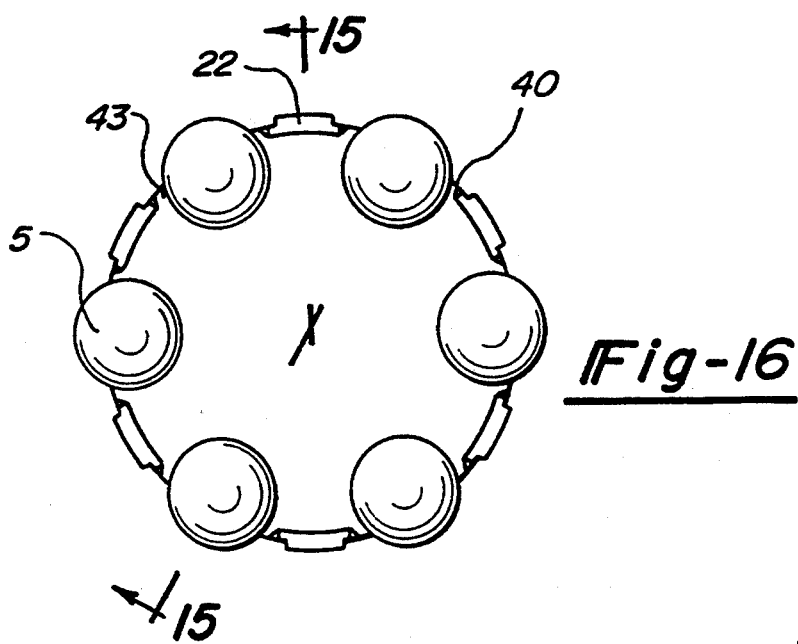
FIG. 16 is a plan view of the annular supporting ring and its angular position relative to the balls and running grooves.

FIG. 16 shows the design of the annular ring 6 and the position of the wedge-shaped supporting inserts 22 relative to the outer running grooves 15. FIG. 16 also shows the location of the nominal fracture regions 40.

Figure 17:
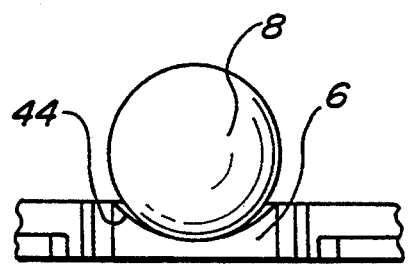
FIG. 17 shows the alignment of the annular strip with the help of the recesses at the balls.

FIG. 17 illustrates a recess 44 which cooperates with a ball 8 and which facilitates true-to-angle positioning of the annular ring 6.

Figure 18:
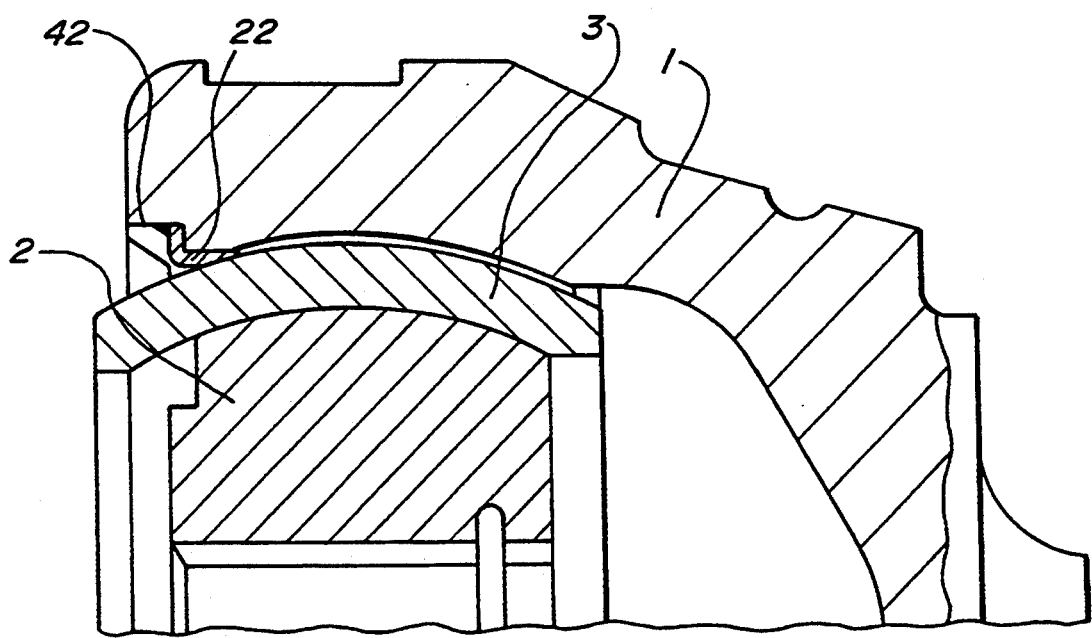
FIG. 18 is an enlargement of the longitudinal section according to FIG. 15.

In FIG. 18 it can be seen that the wedge-shaped inserts 22 are secured in the recesses 42 by welding. The supporting inserts 22 are fixed at a certain distance from the axial depth of the recesses 42 in order to ensure that the play within the joint is set accurately.

Figure 19:
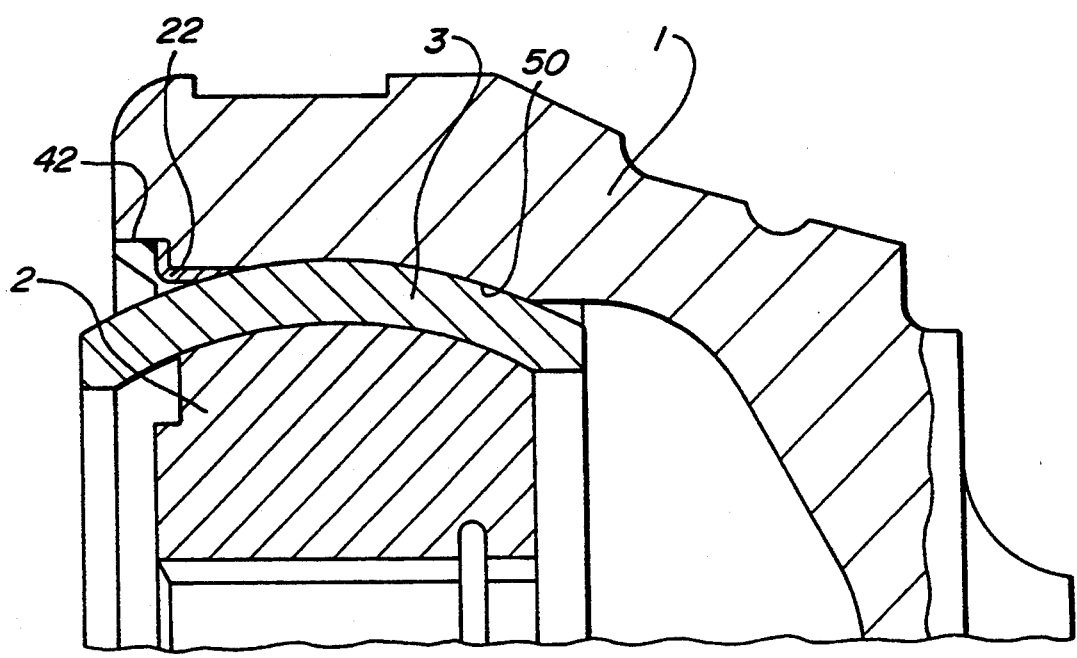
FIG. 19 is an enlargement of a longitudinal section through a constant velocity universal joint in accordance with another embodiment of the invention.

In FIG. 19 it can be seen that the wedge-shaped inserts 22 are also secured in the recesses 42 by welding. In the embodiment shown in FIG. 19, the undercut-free inner face 50 of the outer joint part 1 embraces the cage, with the cage being axially outwardly supported by supporting inserts 22 arranged between the outer running grooves.

While the above detailed description describes the preferred embodiment of the present invention, it should be understood that the present invention is susceptible to modification, variation and alteration without deviating from the scope and fair meaning of the subjoined claims.

What is claimed:

1. A constant velocity fixed joint comprising:
   a bell-shaped outer joint part having an open end, a cavity and a plurality of uniformly circumferentially distributed undercut-free outer running grooves, said outer joint part further having inner faces arranged between said outer running grooves, said inner faces being designed to be undercut-free;
   an inner joint part disposed within said cavity and having a plurality of inner running grooves corresponding to said outer running grooves;
   a cage having a plurality of windows and a spherical outer face, said cage being arranged between said outer joint part and said inner joint part;
   a torque transmitting ball received in each of said plurality of inner and outer running grooves and guided in a respective window of said cage;
   a punched or stamped one piece ring being provided with an annular base and at least two unitary fingers pointing axially and radially inwardly into said cavity of said outer joint part, each of said fingers being held between two adjacent outer running grooves so as to abut said spherical outer face of said cage in order to axially outwardly secure said cage, said ring annular base being welded to said outer joint part to prevent movement of the base with respect to the outer part and to form a gap between said ring and outer joint part such that said ring is arranged at an axial distance from a radial end face located at said open end of said outer joint part, and said fingers observing a predetermined axial play relative to said cage with said spherical outer face of said cage being held at a distance from said inner faces of said outer joint part arranged between adjacent outer running grooves.

2. A joint according to claim 1 wherein each of said fingers of said ring connected to said outer joint part is crimped towards said cavity.

3. A joint according to claim 1 wherein each of said fingers are designed as wedge-shaped supporting projections pointing away approximately axially from said ring.

4. A joint according to claim 1 wherein said outer joint part, at said radial end face associated with said open end, is provided with a radially inner recess operable to receive said ring, the inner diameter of said recess being greater than the outer diameter of said ring.

5. A joint according to claim 1 wherein said ring is provided with a projection coaxially embracing the outer circumference of said outer joint part.

6. A joint according to claim 5 wherein said coaxial projection of said ring is used as a seat for a convoluted boot secured to said outer joint part.

7. A joint according to claim 1 wherein the diameter of said ring is greater than the outer circumference of said outer joint part and that the part of said ring projecting beyond the outer circumference of said outer joint part is used as a stop for a convoluted boot secured to said outer circumference of said outer joint part.

8. A joint according to claim 1 wherein said outer joint part, at said open end, is provided with at least two radially extending grooves, said ring being secured in the radially outer region of said outer joint part, said fingers corresponding to said grooves and passing radially through said grooves such that they are held so as to abut said spherical outer face of said cage.

9. A joint according to claim 1 wherein said outer joint part, at said open end, is provided with a continuous step in order to receive said ring.

10. A joint according to claim 1 wherein said ring is produced from a radially extending flat material and is welded via a V-weld to the outer circumference of said outer joint part.

11. A joint according to claim 1 wherein said ring extends coaxially relative to the joint axis and embraces the outer circumference of said outer joint part, said ring being welded to said outer joint part via a fillet weld, said fingers being angled relative to said joint axis.

12. A joint according to claim 1 wherein each of said fingers, starting from the inwardly directed radial direction, are additionally angled approximately axially towards the center of said joint to form an angled web, said web being adapted to engage said spherical outer face of said cage.

13. A joint according to claim 1 wherein each of said fingers are designed approximately as hollow box-like profiles having a contact face adapted to said spherical outer face of said cage.

14. A joint according to claim 1 wherein each of said fingers are designed as solid profiles having a rectangular cross-section, with a radially inner face adapted to said spherical outer face of said cage.

* * * * *